(12) United States Patent
Kapeliouchko et al.

(10) Patent No.: US 6,479,591 B2
(45) Date of Patent: Nov. 12, 2002

(54) FINE POWDERS OF POLYTETRAFLUOROETHYLENE

(75) Inventors: Valery Kapeliouchko, Alessandria (IT); Enrico Marchese, Asti (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/907,821

(22) Filed: Jul. 19, 2001

(65) Prior Publication Data

US 2002/0035221 A1 Mar. 21, 2002

(30) Foreign Application Priority Data

Jul. 20, 2000 (IT) .......................... MI00A1657

(51) Int. Cl.$^7$ .................. C08L 27/12; C08F 214/18
(52) U.S. Cl. ................. 525/199; 525/200; 526/247; 526/244; 526/250
(58) Field of Search ................ 525/199, 200; 526/247, 244, 250

(56) References Cited

U.S. PATENT DOCUMENTS

| 3,009,892 A | 11/1961 | Duddington et al. |
| 3,526,614 A | 9/1970 | Schindler |
| 3,865,845 A | 2/1975 | Resnick |
| 3,978,030 A | 8/1976 | Resnick |
| 4,036,802 A | 7/1977 | Poirier |
| 4,391,940 A | 7/1983 | Kuhls et al. |
| 4,908,461 A | 3/1990 | Hung |
| 4,910,276 A | 3/1990 | Nakamura et al. |
| 5,245,054 A | 9/1993 | Navarrini et al. |
| 5,296,617 A | 3/1994 | Navarrini et al. |
| 5,589,557 A | 12/1996 | Navarrini et al. |
| 5,731,394 A | 3/1998 | Treat et al. |

FOREIGN PATENT DOCUMENTS

| EP | 0 380 120 A2 | 8/1990 |
| EP | 0 633 257 B1 | 1/1995 |
| EP | 0 764 668 A1 | 3/1997 |

*Primary Examiner*—James J. Seidleck
*Assistant Examiner*—Olga Asinovsky
(74) *Attorney, Agent, or Firm*—Arent Fox Kintner Plotkin & Kahn

(57) ABSTRACT

Fine powders of modified PTFE having a "core-shell" structure; the fine powder being formed by:

a "core" of tetrafluoroethylene (TFE) modified by one or more monomers selected from:
   a) dioxoles;
   b) one or more perfluorinated monomers which cyclize during the polymerization;

a "shell" of TFE modified by perfluoropropene (PFP); the amount, referred to the total core+shell particle, of comonomers 1) in the "core" being in the range 0.01–0.06% by weight; the amount, referred to the total core+shell particle, of perfluoropropene 2) in the "shell" being in the range 0.002–0.06% by weight;

the thermal instability index (TII) of the fine powder being equal to or lower than 5, determined according to ASTM D4895.

13 Claims, No Drawings

FINE POWDERS OF POLYTETRAFLUOROETHYLENE

The present invention relates to fine powders of PTFE having a very good thermal stability, particularly suitable for lubricated extrusion processes with high reduction ratios.

Specifically, the invention relates to fine powders of modified PTFE having a core-shell structure wherein the core is formed by PTFE modified by a perfluorodioxole monomer or which cyclizes during the polymerization to give a ring containing at least one oxygen atom, and wherein the shell is formed by PTFE modified by perfluoropropene. The fine powders of the modified PTFE of the present invention show very good thermal stability and are processable by lubricated extrusion at high reduction ratios at low extrusion pressure. This treatment allows to obtain manufactured articles without surface defects, i.e. without fractures and roughnesses.

It is known that the modified PTFE is a polymer based on tetrafluoroethylene (TFE) which contains small amounts of comonomers and which, as well as the PTFE homopolymer, cannot be transformed as thermoprocessable.

The fine PTFE powders are obtained by the polymerization in dispersion (emulsion). In said process a sufficiently high amount of surfactant is used so to stabilize the colloidal PTFE particles and a mild stirring is applied to avoid the polymer coagulation (precipitation). Subsequently the latex obtained from said process is coagulated, and the powder obtained from the coagulation is called "fine poder".

Another TFE polymerization process is known: the suspension polymerization, wherein only a small or no amount of surfactant is used and a strong stirring is applied to obtain the precipitated polymer flocks. With this process in suspension fine powders are not obtained.

The PTFE fine powders are transformed by the lubricated extrusion process for obtaining the desired manufactured articles. To obtain a productivity increase and manufactured articles having thin wall, for example used in the cable insulation, it is important to be able to extrude at high reduction ratios. With the term reduction rate (RR) the A2:A1 ratio is meant, wherein:

A2 is the cyclinder section surface in which the PTFE preform is introduced before the extrusion, A1 is the outlet section surface of the extruder nozzle.

Generally, by increasing the reduction ratio the extrusion pressure increases and therefore the defects of the extruded manufactured article increase. Therefore it is important to obtain a fine PTFE powder which is suitable to be extruded at high reduction ratios with a sufficiently low pressure obtaining extruded manufactured articles which do not show surface defects, such as for example fractures, roughnesses.

The PTFE manufactured articles are often used under extreme conditions, including applications at high temperature, wherein it is important to have a material having the highest thermal stability as possible. Furthermore, a high thermal stability of the PTFE is required since the PTFE has not to undergo thermal degradation during the transformation process.

In U.S. Pat. No. 4,036,802 it is described how to obtain fine PTFE powders suitable for the transformation by lubricated extrusion at high reduction ratios (RR), obtaining in the polymerization process a core-shell structure, wherein both the core and the shell of the particle are formed by PTFE modified with the same comonomer, and the content of the modifying agent comonomer in the core is higher than that of the shell. Preferably perfluoroalkylvinylethers are used as modifying comonomers. The process described in this patent requires, after the polymerization step of the core, a partial removal of the TFE and of the comonomer from the reactor, the stop of the polymerization, the subsequent repressurization by using only TFE, and the subsequent restarting of tile polymerization. Such process, called "vent-repressure", has the purpose to reduce the comonomer amount in the particle shell with respect to the core. However, the reaction stop and restarting very often cause latex destabilization phenomena which cause the coagulum formation both in the reactor and during the subsequent latex processing (transfers, storage, filtering, concentration, etc.). Besides such process complicates the productive process and it reduces the productivity of the polymerization reactor.

In U.S. Pat. No. 5,731,394 it is described how to obtain modified fine powders suitable for the extrusion at high reduction ratios without the vent-pressure procedure, using the combination of perfluoroalkylethylene and perfluoropropylvinylether for the core modification. In this patent the obtained fine powders show a low extrusion pressure and a good adhesion to the cable. The low extrusion pressure is obtained by using a shell based on PTFE having a low molecular weight. However, the use of PTFE having a low molecular weight implies a low thermal stability of the obtained fine powder. Tests carried out by the Applicant, see the Examples, show that the presence of perfluorobutylethylene as modifying agent in the core decreases the thermal stability of the obtained fine powder.

In EP 764,668 it is described how to obtain modified fine powders suitable for high reduction ratios, preparing the core with PTFE modified by the perfluorobutylethylene (PFBE), while the shell is modified by perfluoropropene and applying the vent-repressure procedure for a complet removal of PFBE and TFE after having polymerized the core. Tests carried out by the Applicant, see the Examples, wherein perfluorobutylethylene is used for the core modification, give a polymer having a low thermal stability. Besides, the vent-repressure procedure used in EP 764,668 has an impact on the stability of the obtained latex and on the reactor productivity as above said.

In U.S. Pat. No. 4,391,940 modified fine powders suitable for the extrusion at high reduction ratios are obtained, making a three-layer core-shell structure of the particle: the core is formed by PTFE modified with at least a comonomer, the intermediate layer is PTFE homopolymer, and the particle shell is PTFE modified by fluoroolefins; the ratio by weight between the intermediate layer and the shell being in the range 75:25–99.5:0.5, the core being from 5 to 20% by weight of the total particle. To obtain said structure two techniques are used: vent-repressure and seed. The use of these techniques complicates the process, lowers the stability of the latex and reduces the reactor productivity.

In EP 380,120 fine powders having a core-shell structure are obtained, wherein the core is modified by a perfluorodioxole, the shell being formed by PTFE homopolymer or PTFE modified with a perfluoroalkylvinylether. The fine powders obtained according to this patent are not suitable for the extrusion at high reduction ratios. In fact, the manufactured articles obtained by extrusion at high reduction ratios of fine powders having a core modified by a perfluorodioxole and the shell modified by perfluoropropylvinylether show a rough surface (see the Examples).

The need was therefore felt to have available fine powders of modified PTFE having an improved thermal stability, suitable to be transformed by lubricated extrusion at high reduction ratios with a low extrusion pressure for obtaining extruded manufactured articles not showing surface defects, for example fractures, roughnesses.

An object of the present invention are therefore fine powders of modified polytetrafluoroethylene (PTFE) having a core-shell structure; the fine powder being formed by:
1) a "core" of tetrafluoroethylene (TFE) modified by one or more monomers selected from:
   a) dioxoles of formula:

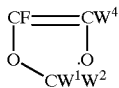

(I)

wherein $W^1$ and $W^2$, equal to or different from each other, represent F or $CF_3$, $W^4$=F, $R_f$, $OR_f$, with $R_f$ equal to a perfluoroalkyl radical containing from 1 to 5 carbon atoms;
   b) one or more perfluorinated monomers which cyclize during the polymerization;
2) a "shell" of TFE modified by perfluoropropene (PFP); the amount, referred to the core+shell total particle, of comonomers of 1) being in the range 0.01–0.06% by weight; the amount, referred to the core+shell total particle, of perfluoropropene of 2) being in the range 0.002–0.06% by weight; the thermal instability index (TII) of the fine powder being equal to or lower than 5, determined according to ASTM D4895.

The preparation of the comonomers dioxoles a) is reported for example in U.S. Pat. No. 4,908,461, U.S. Pat. No. 5,245,054, U.S. Pat. No. 5,296,617 and in EP 633,257.

The preferred comonomers dioxoles a) are:
the compound having $W^1$=$W^2$=F, $W^4$=$OCF_3$ (perfluoromethoxydioxole), the preparation of which is described in EP 633,257;
the compound having $W^1$=$W^2$=$CF_3$, $W^4$=F, the preparation of which is reported in U.S. Pat. No. 3,865,845 and U.S. Pat. No. 3,978,030;
the compound having $W^1$=$W^2$=$W^4$=F, the preparation of which is reported in U.S. Pat. No. 3,978,030 and U.S. Pat. No. 3,865,845.

Among the perfluorinated comonomers of type b) it can be mentioned:
bisvinyloxymethanes of structure:

$CF_2$=CF—O—$CX_3X_4$—O—CF=$CF_2$, wherein $X_3$ and $X_4$, equal to or different from each other, are F or $CF_3$, which form in the polymer cyclic repeating units having the structure:

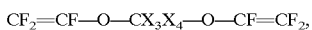

(II)

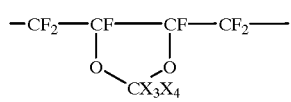

(III)

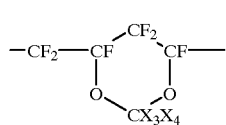

Preferably perfluorobisvinyloxymethane is used wherein $X_3$=$X_4$=F. Bisvinyloxymethanes are described in U.S. Pat. No. 5,589,557.

perfluorinated compounds having the structure:

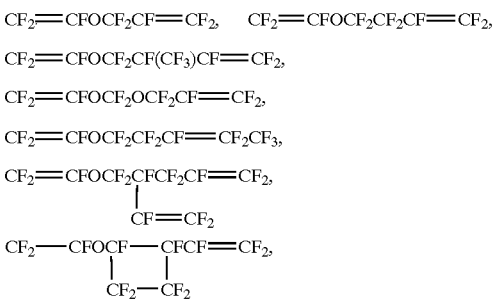

Said compounds are described in U.S. Pat. No. 4,910,276.

The modified PTFE fine powders of the present invention contain therefore a very small amount of comonomers, such that the polymer is not thermoprocessable from the melt, i.e. the melt polymer viscosity is higher than $10^8$ Pa×sec at 380° C. The type and the amount of comonomers incorporated in the fine powder of the present invention guarantee a very good thermal stability, represented by a thermal instability index (TII) equal to or lower than 5, preferably lower than 1. This low value of thermal instability represents a clear improvement with respect to the fine powders of the prior art, wherein TII indexes generally lower than 20 are reported.

The fine powders of the present invention can be extruded at high reduction ratios, higher than 1:1,600, for example 1:2,500. If desired, the powders of the invention can also be processed at low reduction ratios (for example RR=1:115).

The molecular weight of the modified PTFE of the present invention is high as shown from the absolute specific weight values, which are of the order of 2.1–2.2 g/cm³. The skilled is able to estimate from the density values and from the comonomer content the molecular weight of the modified PTFE.

It has been found by the Applicant that when the content of comonomer 1) in the core is lower than 0.01% by weight, the obtained powder generates in the extrusion at high reduction ratios pipes having a poor consistence, wherefore the material separates in more pieces during the extrusion or fractured pipes are obtained. When on the contrary the content is higher than. 0.06% by weight, the extrusion pressure increases too much and the obtained product cannot be extruded with high reduction ratios. Besides, when the comonomer 1) amount is higher than the indicated range, a further drawback resides in that a part of the unreacted comonomer 1) remains in the reactor during the polymerization of the shell. When, as in this case, the shell contains PTFE modified both by the comonomer 1) and by the perfluoropropene 2), no extruded manufactured articles having a good surface finishing coat are obtained from the extrusion process, wherefore the surface shows defects which make the manufactured article unsuitable to the use.

It has been found by the Applicant that when the perfluoropropene content in the particle shell is lower than the indicated values, the extrusion pressure of the obtained fine powders strongly increases and the fine powder cannot be processed at high reduction ratios. On the contrary, when the PFP content is higher than the indicated values, the manufactured article has no suitable tensile properties before sintering, in particular it shows low green strength, wherefore the sintered manufactured article shows undesired surface defects.

A further object of the invention is a process for obtaining the above PTFE fine powders, comprising:

radical emulsion polymerization of tetrafluoroethylene (TFE) with a comonomer 1), for example perfluoromethoxydioxole, wherein the comonomer 1) is fed into the reactor during the initial part of the reaction; in particular, all the comonomer 1) is fed into the reactor before 20% of the TFE conversion, preferably all the comonomer 1) is fed at the starting of the reaction;

feeding of perfluoropropene (PFP) after more than 80% of tetrafluoroethylene which is to be polymerized, has reacted, preferably after not more than 95% of TFE has reacted; preferably the feeding of the desired PFP amount is carried out in a continuous way until the end of the TFE polymerization; during the polymerization the TFE pressure being maintained constant at a prefixed value between 10 and 30 bar.

Therefore, in the process of the invention the vent-repressure system is not used, i.e. a reduction of the reaction pressure through the reactor vent and a subsequent restoration of the pressure during the reaction is avoided.

The polymerization is carried out at temperatures in the range 50° C.–100° C., preferably 70° C.–90° C. The combination of the polymerization temperature and of the amount of polymerization initiators, must be such as to assure a high molecular weight of the obtained polymer, as above defined by the specific weight values. The skilled on the basis of the temperature used for the polymerization, is able to identify the initiator amount for obtaining said specific weight values of the polymer.

The fed amount of comonomer 1) is generally in the range 0.01–0.06% by weight based on the total reacted TFE, so that the content of comonomer 1) in the polymer is in the range 0.01 and 0.06% by weight.

As regards perfluoropropene (PFP), the feeding into the reactor must start after more than 80% of tetrafluoroethylene has reacted and before 95% of TFE has reacted. In any case the comonomer 1) must not be present any longer in the reactor when PFP is fed. Preferably, the PFP feeding is carried out in a continuous way until the end of the polymerization. In this way the reaction temperature is better controlled avoiding sudden temperature drops.

In the process of the present invention as radical initiators those typical of the TFE polymerization are used. Preferably the persulphate, permanganate salts or hydrosoluble organic peroxides, such as for example the disuccinic acid peroxide (DSAP) are used. More preferably a mixture of the disuccinic acid peroxide (DSAP) with a persulphate, preferably ammonium persulphate (APS), is used as initiator, with a ratio by weight DSAP/APS in the range 2–50, preferably 10–25. Generally an amount of one or more initiators in the range 3 ppm–350 ppm by weight with respect to the polymerization water, preferably an amount in the range 15 ppm–150 ppm by weight is used. Optionally the initiators can be used together with a reducing agent for producing a part of radicals at the starting of the reaction by a Red-Ox reaction. As reducing agent the Mohr (SdM) salt $(NH_4)_2Fe(SO_4)_2 6H_2O$ can be used. Generally, the amount of the reducing agent is lower than 50% molar referred to the initiator, preferably lower than 25 molar.

As said, the polymerization is carried out under a TFE pressure in the range 10–30 bar. Generally, during the polymerization the pressure is maintained constant by feeding the TFE so as to compensate for the reacted monomer. It can be advantageous in the process of the present invention to carry out a partial react-down at the reaction end.

When the polymerization reaches the final TFE conversion, the TFE and PFP feedings are stopped, temperature and stirring rate are maintained unchanged and the reaction is continued until the pressure inside the reactor falls to the desired pressure, for example 5 bar if the initial polymerization pressure is 20 bar. Then, the stirring is stopped and the reactor is evacuated and cooled. Said procedure allows to form an external layer of the shell having a higher perfluoropropene content.

The average size of the latex particles is substantially in connection with the comonomer 1) content in the core and with the initial concentration of the fluorinated surfactant defined further on. By increasing the diameter of the latex particles, the extrusion pressure tendentially decreases. However, when the particles become too large, the colloidal stability of the latex strongly decreases causing coagulum formation. Consequently, both macroaggregates, in the form of coagulum blocks inside the reactor and microaggregates, which remain dispersed in the latex, form; they after the transformation cause defects of the manufactured article extruded at high reduction ratios.

For said reason the average diameter of the latex particles according to the present invention must be in the range 150 nm–400 nm, preferably 220 nm–300 nm. In order to control the latex particle diameter, the addition of metal cations can be used at the starting of the polymerization according to U.S. Pat. No. 3,526,614, for example under the form of zinc chloride. Another useful method for the particle diameter control is the distributed addition of the fluorinated surfactant during the polymerization, for example according to U.S. Pat. No. 3,009,892.

A further advantage of the invention process is that latex particles having a substantially spherical shape are obtained. The analysis at the scanning electronic microscope (SEM) shows that the latex particles obtained according to the present invention are substantially spherical. This is advantageous since it allows to furtherly reduce the extrusion pressure of the fine powders obtained from latexes.

The fluorinated surfactants used in emulsion in the polymerization process of the present invention can be selected from the following:

$$T\text{-}O\text{-}(C_3F_6O)_n(CF_2O)_m CF_2COOM \quad (IA)$$

wherein: M=H, $NH_4$, Na, Li, K and n can range from 1 to 6, m/n is in the range 0.05–0.1

T is a (per)fluoroalkyl group selected from: $-CF_3$, $-C_2F_5$, $-C_3F_7$, $-CF_2Cl$, $-C_2F_4Cl$, $-C_3F_6Cl$; optionally one or two F atoms can be substituted by H;

$$CF_3(CF_2)_8 COOM \quad (IIA)$$

wherein n can range from 4 to 12

$$F-(CF_2-CF_2)_n-CH_2-CH_2-SO_3M \quad (IIIA)$$

wherein M=H, $NH_4$Na, Li, K and r can range from 2 to 5.

Among the surfactants (IIIA), preferably $C_6F_{13}CH_2CH_2SO_3M$ wherein M=H or monovalent cation, for example K (commercial product ZONYL® 6,2-TBS or FORAFAC® 1033) can be mentioned.

The preferred surfactants are the perfluorooctanoic acid salts, in particular ammonium perfluorooctanoate (PFOA). The total surfactant amount is generally in the range 0.5–5 g for liter of reaction medium, preferably 1–3 g for liter. The fluorinated surfactant can also be partly fed at the starting of the polymerization and partly during the polymerization reaction.

To prevent the aggregation phenomena of the latex particles during the polymerization it is advantageous to add into the reactor a stabilizer. For the process of the present invention paraffins with softening point in the range 48° C.–62° C. are preferred as stabilizers.

The latex obtained from the polymerization is commonly diluted until a concentration of 10–15% by weight of polymer and is coagulated under mechanical stirring in the presence of an electrolyte at a concentration in the range $10^{-3}$–$10^{-1}$ moles/l. The coagulation conditions (stirring rate and temperature) are selected so as to obtain a fine powder having an average size in the range 350–600 microns. Subsequently the fine powders obtained from the coagulation are separated from the water and dried in an oven at a temperature in the range 105° C.–160° C. It is known that the drying temperature affects the extrusion pressure: by increasing the drying temperature, the extrusion pressure increases, therefore in the process of the present invention it is preferable that the fine powders are dried at a temperature in the range 110°–140° C. During the post-treatment process (coagulation and drying) it is very important that the fine PTFE powders are not damaged or crushed, since if the granules are damaged, it is not possible to obtain an extruded manufactured article of good quality. Among manufactured articles, pipes and cable coatings can be mentioned.

Some embodyment Examples of the present invention are reported hereinafter, the purpose of which is merely illustrative but not limitative of the scope of the invention itself.

EXAMPLES

Characterization

The average diameter of the particles is measured by an instrument based on laser light diffusion, specifically on Photon Correlation Spectroscopy, equipped with Brookhaven correlator 2030 AT model and Argon Laser light source having a wave length 514.5 nm by Spectra-Physics. The latex samples to be subjected to measurement, are suitably diluted with water filtered at 0.2 $\mu$m on Millipore filter. The scattering measurement is carried out at room atemperature at an angle 90°. The diameter of the latex particles is obtained by the accumulating counter method.

The polymer content of the latex discharged from the reactor is estimated by weight loss at 150° C. for 1 hour. In particular about 20 grams of latex are weighed in a glass beaker and placed in a stove to dry for 1 hour at 150° C. The dry content of the latex is obtained from the formula:

Dry product %=100×weight after drying/latex initial weight

The transformation technology is based on the lubricated extrusion of the PTFE. Extrusion is carried out by Jennings extruder.

Reduction ratios equal to 1:2,500, 1:1,058, 1:115 have been used. The extrusion pressure is measured by load cells connected to a recorder.

The perfluoropropene, perfluoropropylvinylether amounts are determined by IR spectroscopy, while the amounts of perfluoromethoxydioxole and perfluorobutylethylene are determined by the calculations on the mass balances.

The absolute specific weight, the thermal instability index (TII) and the tensile properties are determined according to ASTM D4895.

The thermal stability is determined also by the thermogravimetric analysis by using a Perkin Elmer instrument, series 7. About 10 mg of dried polymer are heated from room temperature up to 425° C. at the rate of 20° C./min. At 425° C., the temperature is automatically stabilized by the instrument and the sample is maintained at that temperature for 2 hours. The per cent loss by weight is then recorded and used as index of the thermal stability of the polymer (TGA).

EXAMPLE 1

Polymerization 11 grams of an aqueous solution of ammonium perfluorooctanoate, 900 mg of an aqueous $ZnCl_2$ solution and 31 liters of carefully degassed demineralized water are fed into a 50 liter autoclave equipped with a mechanical stirrer and previously put under vacuum. Also 140 grams of paraffin with softening point in the range 52° C.–54° C. have been previously introduced into the reactor. 8.6 grams of perfluoromethoxydioxole (MDO) of formula a) with $W^1=W^2=W^3=F$, $W^4=OCF_3$, and 500 cc of a $(NH_4)_2S_2O_8$ (APS) solution and disuccinic peroxide (DSAP) corresponding to 400 mg of APS and 2,000 mg of DSAP are fed into the autoclave. The autoclave is kept under mechanical stirring and is pressurized with TFE up to a pressure of 20 bar at a temperature of 56° C. At this point 500 cc of a $(NH_4)_2Fe(SO_4)_2 6H_2O$ (SdM) solution corresponding to 65 mg of SdM are fed into the autoclave.

When the pressure in the reactor has decreased of 0.5 bar, one starts to feed TFE by a compressor so as to maintain a constant pressure of 20 bar inside the reactor. In the meantime the reactor internal temperature is increased up to 76° C. at a rate equal to 0.5° C./min. During the reaction 50.5 grams of the aqueous solution containing 100 grams/liter of ammonium perfluorooctanoate are fed into the autoclave. When 12,640 grams of TFE have reacted, perfluoropropene (PFP) in a ratio of 4.1 grams of PFP/1 kg of fed TFE is introduced into the autoclave by a metering pump. After 147 minutes, the TFE and PFP feedidng is stopped, when 15,800 grams of TFE have reacted, the reactor vented and cooled. The discharged latex has a concentration of 507 g PTFE/liter of water.

The diameter of the polymer primary particles, measured by Laser Light Scattering (LLS), results equal to 248 nm. The obtained latex is diluted with water to about 14% by weight of PTFE, then it is coagulated under strong stirring and with the addition of the nitric acid to have a concentration of about 0.01 M of $HNO_3$. The obtained powder is washed with demineralized water and dried in a static oven at 130° C. for 32 hours. On the dry powder the PFP content in the polymer, equal to 0.005% by weight, and the absolute specific weight equal to 2.161 g/cm³, are determined.

The MDO comonomer content in the core is calculated by the mass balance on the basis of the gas-chromatographic analyses and it is equal to 0.054% by weight. The thermal instability index (TII) of the powder results to be equal to −12.

From the thermogravimetric analysis carried out as above described, a percentage of weight loss equal to 0.017% is deduced.

The polymerization conditions are summarized in Table 1. The results of the characterization of the obtained product are reported in Table 2.

EXAMPLE 2

Polymerization 11 grams of the aqueous solution of ammonium perfluorooctanoate, 900 mg of the aqueous $ZnCl_2$ solution and 31 liters of carefully degassed demineralized water are fed into a 50 liter autoclave equipped with a mechanical stirrer and previously put under vacuum. Also 140 grams of paraffin with softening point in the range 52° C.–54° C. had been previously introduced into the reactor. 5.5 grams of perfluoromethoxydioxole (MDO) and 500 cc of a $(NH_4)_2S_2O$ (APS) solution and disuccinic peroxide (DSAP) corresponding to 400 mg of APS and 3,600 mg of DSAP are fed into the autoclave. The autoclave is kept under mechanical stirring and is pressurized with TFE up to a pressure of 20 bar at a temperature of 59° C. At this point 500 cc of a $(NH_4)_2Fe(SO_4)_2 6H_2O$ (SdM) solution corresponding to 70 mg of SdM are fed into the autoclave.

When the pressure in the reactor has decreased of 0.5 bar, one starts to feed TFE by a compressor so as to maintain a constant pressure of 20 bar inside the reactor. In the meantime the reactor internal temperature is increased up to 81.3° C. at a rate equal to 0.5° C./min. During the reaction 50.5 grams of the aqueous solution containing 100 grams/liter of ammonium perfluorooctanoate are fed into the autoclave. When 12,640 grams of TFE have reacted, perfluoropropene (PFP) in a ratio of 13.3 grams of PFP/1 kg of fed TFE is introduced into the autoclave by a metering pump. After 135 minutes, the TFE and PFP feeding is stopped, when 15,800 grams of TFE have reacted, the reactor vented and cooled. The discharged latex has a concentration of 510 g PTFE/liter of water.

The polymer primary particles diameter, measured by Laser Light Scattering (LLS), results equal to 260 nm. The obtained latex is diluted with water to about 14% by weight of PTFE, then it is coagulated under strong stirring and with the addition of the nitric acid to have a concentration of about 0.01 M of $HNO_3$. The obtained powder is washed with demineralized water and dried in a static oven at 130° C. for 32 hours. On the dry powder the PFP content in the polymer, equal to 0.05% by weight, and the absolute specific weight equal to 2.185 $g/cm^3$, are determined.

The MDO comonomer content in the core is calculated by the mass balance on the basis of the gas-chromatographic analyses and it is equal to 0.035% by weight. The thermal instability index (TII) of the powder results to be equal to 0.

The polymerization conditions are summarized in Table 1. The results of the characterization of the obtained product are reported in Table 2.

EXAMPLE 3

Polymerization 11 grams of an aqueous solution of ammonium perfluorooctanoate, 450 mg of an aqueous $ZnCl_2$ solution and 31 liters of carefully degassed demineralized water are fed into a 50 liter autoclave equipped with a mechanical stirrer and previously put under vacuum. Also 140 grams of paraffin with softening point in the range 52° C.–54° C. had been previously introduced into the reactor. 7.2 grams of perfluoromethoxydioxole (MDO) are fed into the autoclave. The autoclave is kept under mechanical stirring and is pressurized with TFE up to a pressure of 20 bar at a temperature of 62° C. Then 500 cc of a solution of $(NH_4)_2S_2O_8$ (APS) and disuccinic peroxide (DSAP) corresponding to 350 mg of APS and 3,600 mg of DSAP are fed.

When the pressure in the reactor has decreased of 0.5 bar, one starts to feed TFE by a compressor so as to maintain a constant pressure of 20 bar inside the reactor. In the meantime the reactor internal temperature is increased up to 82° C. at a rate equal to 0.5° C./min. During the reaction 50.5 grams of the aqueous solution containing 100 grams/liter of ammonium perfluorooctanoate are fed into the autoclave. When 12,400 grams of TFE have reacted, perfluoropropene (PFP) in a ratio of 5.3 grams of PFP/1 kg of fed TFE is introduced into the autoclave by a metering pump. After 103 minutes, the TFE and PFP feeding is stopped, when 15,500 grams of TFE have reacted, the reactor vented and cooled. The discharged latex has a concentration of 490 g PTFE/liter of water.

The polymer primary particles diameter, measured by Laser Light Scattering (LLS), results to be equal to 247 nm. The obtained latex is diluted with water to about 14% by weight of PTFE, then it is coagulated under strong stirring and with the addition of the nitric acid to have a concentration of about 0.01 M of $HNO_3$. The obtained powder is washed with demineralized water and dried in a static oven at 130° C. for 32 hours. On the dry powder the PFP content in the polymer, equal to 0.018% by weight, and the absolute specific weight equal to 2.191 $g/cm^3$, are determined.

The MDO comonomer content in the core is calculated by the mass balance on the basis of the gas-chromatographic analyses and it is equal to 0.05% by weight. The thermal instability index (TII) of the powder results to be equal to –4.

The polymerization conditions are summarized in Table 1. The results of the product characterization are reported in Table 2.

EXAMPLE 4

Polymerization 11 grams of the aqueous solution of ammonium perfluorooctanoate, 300 mg of the aqueous $ZnCl_2$ solution and 31 liters of carefully degassed demineralized water are fed into a 50 liter autoclave equipped with a mechanical stirrer and previously put under vacuum. Also 140 grams of paraffin with softening point in the range 52° C.–54° C. had been previously introduced into the reactor. 5.0 grams of perfluoromethoxydioxole (MDO) are fed into the autoclave. The autoclave is kept under mechanical stirring and is pressurized with TFE up to a pressure of 20 bar at a temperature of 66° C. At this point 500 cc of a solution of $(NH_4)_2S_2O$ (APS) and disuccinic peroxide (DSAP) corresponding to 125 mg of APS and 2,500 mg of DSAP are fed.

When the pressure in the reactor has decreased of 0.5 bar, one starts to feed TFE by a compressor so as to maintain a constant pressure of 20 bar inside the reactor. In the meantime the reactor internal temperature is increased up to 84.6° C. at a rate equal to 0.5° C./min. During the reaction 50.5 grams of the aqueous solution containing 100 grams/liter of ammonium perfluorooctanoate are fed into the autoclave. When 12,640 grams of TFE have reacted, perfluoropropene (PFP) in a ratio of 5.4 grams of PFP/1 kg of fed TFE is, introduced into the autoclave by a metering pump. After 97 minutes, the TFE and PFP feeding is stopped, when 15,800 grams of TFE have reacted. The react-down procedure has then been used: closing the TRE and PFP feeding and maintaining the temperature and the stirring rate unchanged, the reaction has been allowed to continue to a pressure of 10 bar, then the reactor has been evacuated and cooled. The discharged latex has a concentration of 540 g PTFE/liter of water.

The polymer primary particles diameter, measured by Laser Light Scattering (LLS), results to be equal to 245 nm. The obtained latex is diluted with water to about 14% by weight of PTFE, then it is coagulated under strong stirring and with the addition of the nitric acid to have a concentration of about 0.01 M of $HNO_3$. The obtained powder is washed with demineralized water and dried in a static oven at 130° C. for 32 hours. On the dry powder the PFP content in the polymer, equal to 0.019% by weight, and the absolute specific weight equal to 2.192 $g/cm^3$, are determined.

The MDO comonomer content in the core is calculated by the mass balance on the basis of the gas-chromatographic analyses and it is equal to 0.032% by weight. The thermal instability index (TII) of the powder results to be equal to −2.

The polymerization conditions are summarized in Table 1. The results of the characterization of the obtained product are reported in Table 2.

EXAMPLE 1A
Lubricated Extrusion
Reduction Ratio RR=1:2,500

810 g of fine powder obtained in Example 1 and 190 g of Isopar H oil are poured into a glass vessel. The mixture is mixed in a jar-turning for about 25 minutes and let rest for 15 h. When this rest time has elapsed, a further stirring is carried out for about 10 min.
The possible formed clumps are removed by a 10 mesh sieve. At this point, a cylindrical preform ($D_i \times D_e$=16 mm×54 mm) is prepared at 15 bar for 3 minutes.

After setting on the extruder a die having an angle $2\alpha=20°$ containing a nozzle and a needle having a diameter respectively equal to 1.5 mm and 1.1 mm, the preform is introduced in the chamber of a Jennings extruder. The die head is maintained at 50° C. during the pipe extrusion. The extrusion pressure is equal to 600 $Kg/cm^2$. The extruded article subsequently passes in the drying zone for the oil removal and then in an oven for its continuous sintering. After sintering, a pipe having a smooth and transparent surface appearance, without defects, is obtained.
Reduction Ratio RR=1:1,058

820 g of fine powder obtained in Example 1 and 180 g of Isopar H are poured into a glass vessel. One continues as previously described for RR=2,500 with the following differences:
  die (angle $2\alpha=30°$);
  nozzle (D=2.13 mm);
  needle (D=1.42 mm).
The extrusion pressure is equivalent to 360 $Kg/cm^2$ and the pipe surface appearance, after sintering, is smooth and transparent.
Reduction Ratio 1:115

820 g of fine powder obtained in Example 1 and 190 g of Isopar H are poured into a glass vessel. One continues as previously described. The diameters of the nozzle and of the needle are respectively equal to 6.36 mm and 4.16 mm. The die has an angle $2\alpha=30°$. The extrusion pressure is equal to 40 $Kg/cm^2$. The pipe surface appearance, after sintering, is smooth and transparent.

The results of the lubricated extrusion are reported in Table 3.

EXAMPLE 2A
Lubricated Extrusion
Starting from the fine powder obtained. in Example 2 and from Isopar H in the same amounts of Example 1A, a cylindrical preform is prepared ($D_i \times D_e$=16 mm×54 mm) at 15 bar for 3 minutes. The preform is introduced in the chamber of a Jennings extruder and one proceeds with the pipe extrusion.

The results of the lubricated extrusion carried out at high reduction ratio (1:2,500) are obtained following the procedures illustrated in Example 1A and they are reported in Table 3.

EXAMPLE 3A
Lubricated Extrusion
Starting from the fine powder obtained in Example 3 and from Isopar H in the same amounts of Example 1A, a cylindrical preform is prepared ($D_i \times D_e$=16 mm ×54 mm) at 15 bar for 3 minutes. The preform is introduced in the chamber of a Jennings extruder and one proceeds with the pipe extrusion.

The results of the lubricated extrusion carried out at reduction ratios equal to 1:2,500 and 1:115, are obtained following the procedures illustrated in Example 1A and they are reported in Table 3.

EXAMPLE 4A
Lubricated Extrusion
Starting from the fine powder obtained in Example 4 and from Isopar H in the same amounts of Example 1A, a cylindrical preform is prepared ($D_i \times D_e$=16 mm×54 mm) at 15 bar for 3 minutes. The preform is introduced in the chamber of a Jennings extruder and one proceeds with the pipe extrusion.

The results of the lubricated extrusion carried out at a reduction ratio equal to 1:2,500, are obtained following the procedures illustrated in Example 1A and they are reported in Table 2.

EXAMPLE 5
Comparative

In this Example the same polymerization procedure of Example 1 is used, but using the amounts indicated in Table 1 and using as comonomer in the particle core the perfluorobutylethylene (PFBE).

The characterization results of the obtained product are reported respectively in Tables 2 and 3.

From the thermogravimetric analysis carried out as above described, a weight loss percentage is deduced equal to 0.053%. The thermal instability index (TII) is equal to 11, wherefore the obtained product is thermally less stable than the fine powder of the invention. Besides, it has a worse processability in the extrusion at high reduction ratios (1:2,500) with respect to the product obtained according to the present invention. In fact, after sintering, a pipe showing undulations on the surface is obtained.

EXAMPLE 6
Comparative

In this Example the same polymerization procedure of Example 1 is used, but using the amounts indicated in Table 1 and using as comonomer of the particle core the perfluoropropylvinylether (PPVE).

The characterization results of the obtained product are reported respectively in Tables 2 and 3.

As shown in Table 3, the obtained product has a poor processability in the extrusion at high reduction ratios. In fact, after sintering, a pipe showing roughnesses on the surface is obtained.

EXAMPLE 7

Comparative

In this Example the same polymerization procedure of Example 1 is used, but using the amounts indicated in Table 1 and obtaining the particle core with TFE homopolymer. As shown in Table 3, the product obtained under these conditions has no consistence in the extrusion at high reduction ratios, wherefore it separates in more pieces during the extrusion.

EXAMPLE 8

Comparative

In this Example the same polymerization procedure of Example 1 is used, but using the amounts indicated in Table 1 and obtaining the particle shell with TFE homopolymer. As shown in Table 3, the product obtained at high reduction ratios (1:2,500) has a poor processability in the extrusion, since the obtained pipe after sintering, shows a rough surface. Besides, for the extrusion at high reduction ratio, a too high extrusion pressure is required, unacceptable as working pressure of an extruder.

EXAMPLE 9

Comparative

In this Example the same polymerization procedure of Example 1 is used, but using the amounts indicated in Table 1 and obtaining the particle shell with a PFP content equal to 0.2% by weight and therefore higher than the limit indicated in the invention (0.06% by weight). As shown in Table 3, the product obtained under these conditions has a poor processability in the extrusion at high reduction ratios. In fact, the pipe obtained after sintering, shows a rough surface.

EXAMPLE 10

Comparative

In this Example the same polymerization procedure of Example 1 is used, but using the amounts indicated in Table 1 and obtaining the particle shell modified with perfluoropropylvinylether. As shown in Table 3, the product obtained under these conditions has a poor processability in the extrusion at middle (1:1,058) and high (1:2,500) reduction ratios. In fact, the pipe obtained after sintering, shows a rough surface.

TABLE 1

| | Polymerization conditions | | | | | | Comonomers | | | |
|---|---|---|---|---|---|---|---|---|---|---|
| | INIZIATORS | | | TEMPERATURE | | | "core" | | "shell" | |
| | DSAP (mg) | APS (mg) | SdM (mg) | INIT (° C.) | MAX (° C.) | ZnCl$_2$ (mg) | Type | Amount (g) | Type | Amount (g) |
| Ex. 1 | 2000 | 400 | 65 | 56 | 76 | 900 | MDO | 8.6 | PFP | 13 |
| Ex. 2 | 3600 | 400 | 70 | 59 | 81.3 | 900 | MDO | 5.5 | PFP | 42 |
| Ex. 3 | 3600 | 350 | — | 62 | 82 | 450 | MDO | 7.2 | PFP | 16.5 |
| Ex. 4 | 2500 | 125 | — | 66 | 84.6 | 300 | MDO | 5.0 | PFP | 17 |
| Ex. 5 Comp | 2000 | 400 | — | 76 | 79.5 | 300 | PFBE | 8.8 | PFP | 17 |
| Ex. 6 Comp | 3600 | 320 | — | 60 | 82 | 600 | PPVE | 7.2 | PFP | 13.5 |
| Ex. 7 Comp | 1200 | 400 | 70 | 57 | 79 | — | — | — | PFP | 40 |
| Ex. 8 Comp | 1200 | 400 | 70 | 56 | 80.7 | 900 | MDO | 8.5 | — | — |
| Ex. 9 Comp | 1200 | 400 | 70 | 58 | 80 | 900 | MDO | 8.6 | PFP | 110 |
| Ex.10 Comp | 3820 | 192 | — | 70 | 83.8 | 500 | MDO | 7.5 | PPVE | 7.7 |

TABLE 2

| | COMONOMERS | | | | Average | |
|---|---|---|---|---|---|---|
| | "CORE" | | "SHELL" | | particle | |
| | Type | Amount % by wt. | Type | Amount % by wt. | diameter (nm) | TII |
| Ex. 1 | MDO | 0.054 | PFP | 0.005 | 248 | −12 |
| Ex. 2 | MDO | 0.035 | PFP | 0.05 | 260 | 0 |
| Ex. 3 | MDO | 0.05 | PFP | 0.018 | 247 | −4 |
| Ex. 4 | MDO | 0.032 | PFP | 0.019 | 245 | −2 |
| Ex. 5 Comp. | PFBE | 0.056 | PFP | 0.008 | 192 | 11 |
| Ex. 6 Comp. | PPVE | 0.052 | PFP | 0.007 | 248 | −9 |
| Ex. 7 Comp. | — | 0 | PFP | 0.06 | 230 | — |
| Ex. 8 Comp. | MDO | 0.054 | — | 0 | 251 | −8 |
| Ex. 9 Comp. | MDO | 0.054 | PFP | 0.2 | 255 | — |
| Ex 10 Comp. | MDO | 0.05 | PPVE | 0.07 | 236 | — |

TABLE 3

| | Jenning Extrusion | | | | | | Tensile properties | |
|---|---|---|---|---|---|---|---|---|
| | RR 1:2,500 | | RR 1:1,058 | | RR 1:115 | | Stress at break (MPa) | Elong. at break (%) |
| | Pressure (bar) | Appearance | Pressure (bar) | Appearance | Pressure (bar) | Appearance | | |
| Ex. 1 | 600 | smooth | 360 | smooth | 40 | smooth | — | — |
| Ex. 2 | 420 | smooth | — | — | — | — | — | — |
| Ex. 3 | 600 | smooth | — | — | 32 | smooth | 26.5 | 445 |
| Ex. 4 | 540 | smooth | — | — | — | — | — | — |
| Ex. 5 | 640 | undulated | 400 | smooth | — | — | — | — |
| Comp. Ex. 6 | 650 | rough | — | — | — | — | 27.5 | 525 |
| Comp. Ex. 7 | 400 | no consistence | — | — | — | — | — | — |
| Comp. Ex. 8 | 1180 | rough | — | — | — | — | — | — |
| Comp. Ex. 9 | 755 | rough | — | — | — | — | — | — |
| Comp. Ex 10 | 760 | rough | 500 | rough | — | — | 31.5 | 505 |

What is claimed is:

1. Fine powders of modified polytetrafluoroethylene (PTFE) having a "core-shell" structure; the fine powder being formed by:

1) a "core" of tetrafluoroethylene (TFE) modified by one or more monomers selected from:
   a) dioxoles of formula:

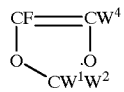
(I)

wherein $W^1$ and $W^2$, equal to or different from each other, represent F or $CF_3$;
$W^4$=F, $R_f$, $OR_f$, with $R_f$ equal to a perfluoroalkyl radical containing from 1 to 5 carbon atoms;
   b) one or more perfluorinated monomers which cyclize during the polymerization;

2) a "shell" of TFE modified by perfluoropropene (PFP);

the amount, referred to the core+shell total particle, of comonomers 1) in the "core" being in the range 0.01–0.06% by weight;

the amount, referred to the core+shell total particle, of perfluoropropene 2) in the "shell" being in the range 0.002–0.06% by weight;

the thermal instability index (TII) of the fine powder being equal to or lower than 5, determined according to ASTM D4895.

2. PTFE fine powders according to claim 1, wherein the comonomers dioxoles a) are:
   the compound having $W^1=W^2=F$, $W^4=OCF_3$;
   the compound having $W^1=W^2=CF_3$, $W^4=F$;
   the compound having $W^1=W^2=W^4=F$.

3. PTFE fine powders according to claim 1, wherein the perfluorinated comonomers of type b) are selected from:
   bisvinyloxymethanes of structure:

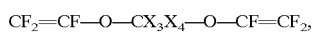

wherein:
$X_3$ and $X_4$, equal to or different from each other, are F or $CF_3$, which form in the polymer cyclic repeating units having the structure:

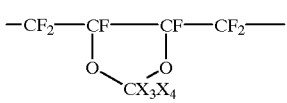
(II)

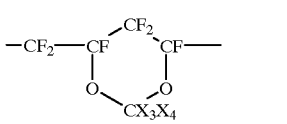
(III)

perfluorinated compounds having the structure:

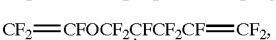

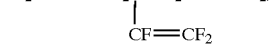

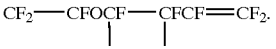

4. PTFE fine powders according to claim 3, wherein as perfluorinated comonomers of type b) perfluorobisvinyloxymethane wherein $X_3=X_4=F$ is used.

5. A process for preparing the PTFE fine powders according to claim 1, comprising:
   radical polymerization in emulsion of tetrafluoroethylene (TFE) with a comonomer 1), wherein all the comonomer 1) is fed into the reactor before 20% of the TFE conversion;
   feeding of perfluoropropene (PEP) after more than 80% o tetrafluoroethylene which is to be polymerized has reacted; the TFE pressure being maintained constant during the polymerization, at a value comprised between 10 to 30 bar.

6. A process according to claim 5, wherein the polymerization is carried out at tempertures in the range 50° C.–100° C., preferably 70° C.–90° C.

7. A process according to claim 5, wherein the PFP feeding is carried out in a continuous way until the end of the polymerization.

8. A process according to claim 5, wherein when the polymerization reaches the final TFE conversion, the TFE and PFP feedings are stopped, and the reaction is allowed to continue until the pressure inside the reactor falls to the desired pressure.

9. A process according to claims 5, comprising a fluorinated surfactant selected from:

$$T-O-(C_3F_6O)_n(CF_2O)_mCF_2COOM \qquad (IA)$$

wherein: M=H, NH$_4$, Na, Li, K and n can range from 1 to 6, m/n is in the range 0.05–0.1;

T is a (per)fluoroalkyl group selected among: —CF$_3$, —C$_2$F$_5$, —C$_3$F$_7$, —CF$_2$Cl, —C$_2$F$_4$Cl, —C$_3$F$_6$Cl; optionally one or two F atoms can be substituted by H;

$$CF_3(CF_2)_qCOOM \qquad (IIA)$$

wherein q can range from 4 to 12

$$F-(CF_2-CF_2)_n-CH_2-CH_2-SO_3M \qquad (IIIA)$$

wherein M=H, NH$_4$, Na, Li, K and r can range from 2 to 5.

10. A process according to claim 9, wherein the fluorinated surfactant is selected between a perfluorooctanoic acid salt and C$_6$F$_{13}$CH$_2$CH$_2$SO$_3$M wherein M=H or monovalent cation.

11. A process according to claim 5, wherein the fine powder obtained from the coagulation is dried at a temperature in the range 105° C.–160° C.

12. A method of using PTFE fine powders according to claim 1 for pipes and cable coatings prepared by lubricated extrusion.

13. Pipes and coated cables obtained according to claim 12.

* * * * *